May 14, 1935.  G. A. SHAMBERGER  2,001,400
AEROPLANE
Filed Feb. 26, 1934   2 Sheets-Sheet 1
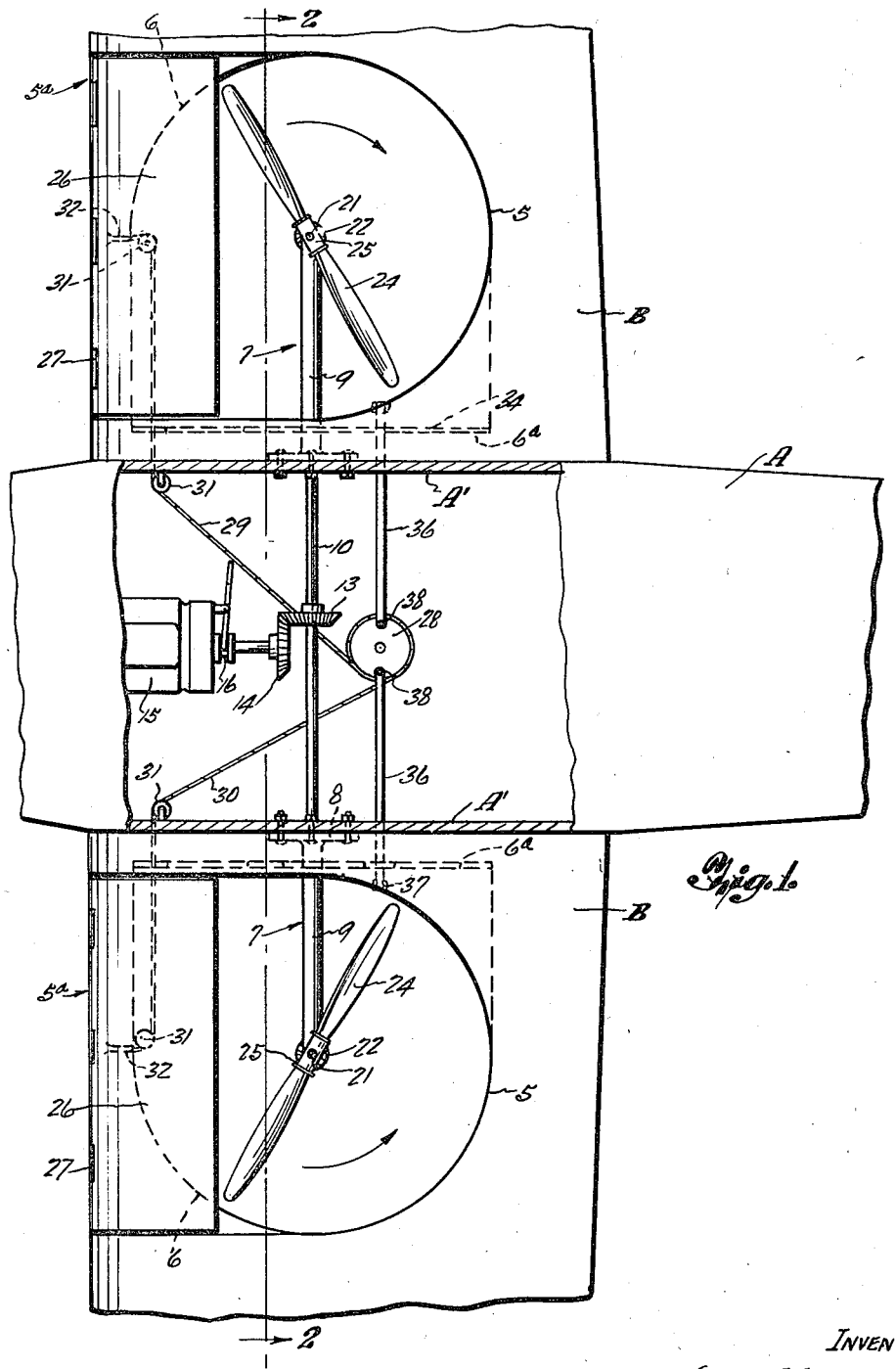
INVENTOR
GEORGE A. SHAMBERGER
By Adam E. Fisher
ATTORNEY May 14, 1935. G. A. SHAMBERGER 2,001,400
AEROPLANE
Filed Feb. 26, 1934 2 Sheets-Sheet 2
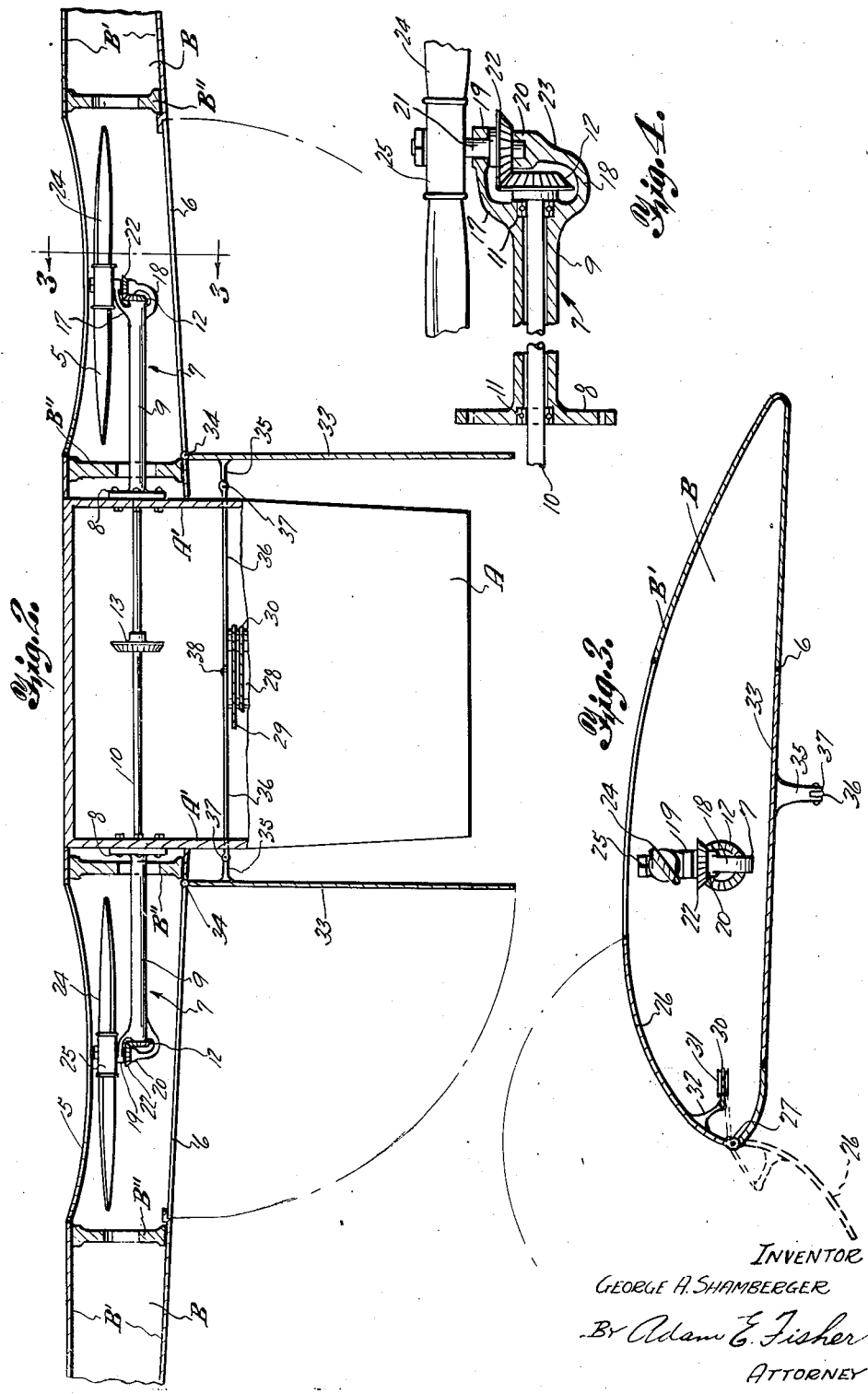
INVENTOR
GEORGE A. SHAMBERGER
By Adam E. Fisher
ATTORNEY Patented May 14, 1935

2,001,400

UNITED STATES PATENT OFFICE 2,001,400

AEROPLANE

George Adams Shamberger, Shaw, Oreg.

Application February 26, 1934, Serial No. 712,911

2 Claims. (Cl. 244—15)

My invention relates to improvements in aeroplanes and the main object is to provide simple, practical and efficient helicopter-like mechanism for braking the landing speed of an aeroplane to permit the same to ascend or descend substantially vertically to the ground and to safely descend should the usual straight away motor and propeller fail.

Another object is to provide such a mechanism made up of a pair of helicopter propellers mounted for rotation in a horizontal plane in suitable openings through the wing of an aeroplane, said openings being arranged to be closed for straight ahead flight and while the helicopter propellers are not in use, and a separate engine, or means connected to the usual engine, for driving the said propellers.

With these and other objects in view the invention resides in the novel construction and arrangement of parts as hereinafter fully set forth and claimed, reference being had to the accompanying drawings as ilustrating one practical embodiment of the invention and wherein:

Figure 1 is a plan view of the midsection of an aeroplane fuselage and wing, partly broken away and in section showing my invention applied thereto.

Figure 2 is a vertical section along the line 2—2 in Figure 1.

Figure 3 is a vertical section along the line 3—3 in Figure 2.

Figure 4 is an enlarged cross sectional detail view of one propeller mounting bracket and drive means.

Referring now with more particularity to the drawings the reference character A designates the fuselage of an aeroplane and B the wing thereof, only the mid-sections of each being shown and the parts being of any conventional construction and form. In accordance with my invention aligned upper and lower openings 5 and 6 are formed through the wing coverings B' preferably immediately adjacent and laterally outward from the fuselage A and between adjacent pairs of the wing ribs B''. Propeller supporting brackets 7 are secured by their diametrically enlarged bases 8 to the sides A' of the fuselage and extend outward at each side through the wing B to substantially the centers of the openings 5 and 6, the tubular stems 9 of said brackets being placed in exact axial alignment to receive a propeller drive shaft 10 which is journaled in bearings 11 therein and extends clear through the fuselage. At its outer ends the shaft 10 carries beveled drive pinions 12 and within the fuselage a larger beveled gear 13 is mounted on the shaft and placed in mesh with a gear 14 driven by an auxiliary engine 15 in the fuselage. This engine is of any conventional form and has a clutch 16 by which the gear 14 may be engaged or disengaged from the engine, the whole structure of course serving to drive the propeller drive shaft 10 when the engine is running and the clutch 16 engaged. Bearing arms 17 and 18 are formed on the outer ends of each bracket 7 and extend outwardly and apart therefrom to clear the drive pinion 12 and outwardly thereof the upper arm 17 on each bracket terminates in a bearing 19 and the lower arm 18 in a socket 20 with their axes extended and aligned vertically as shown. Propeller mounting stub shafts 21 are journaled down through the bearings 19 into the sockets 20 and between these parts beveled driven pinions 22 are secured on the shafts and placed in mesh with the aforesaid drive pinions 12, the whole assembly being held nicely in proper relationship by the juxtaposition of the bearings 19 and sockets 20 which are brought into contact with the pinions 22 by forming the lower arms 18 upwardly just outward of the pinions 12 as indicated at 23 in Figure 4. Helicopter propellers 24 are mounted by their hubs 25 on the extended upper ends of the shafts 21 and are so disposed and arranged as to rotate within the confines of the wing B and in the open space formed therethrough by the openings 5 and 6 as clearly shown. Preferably these propellers are rotated in opposite directions as indicated by the arrows in Figure 1 so as not to disturb the balance of the plane and the pitch of the propeller blades, is set so that a lifting force is exerted on the aeroplane when the propellers rotate.

In use the propellers 24 may be set in operation by starting the engine 15 and engaging the clutch 16 and the lifting force thus provided will cause the aeroplane to ascend or descend substantially vertically, the usual straight-away propeller and engine (not shown) being simultaneously operated in usual manner. In landing the increased lift reduces the necessary landing speed and the size of the landing field required is thus reduced and ascent and descent made much safer. Also the flying speed may be reduced to, or almost to, the hovering point when desired. The greatest utility, however, lies in the safety factor afforded by the provision of the helicopter mechanism which will allow the plane to be landed safely should the usual propeller or engine stall or otherwise become inoperative.

In ordinary straight-away flight in which the helicopter propellers 24 are not in use it is of advantage to close, or substantially close, the wing openings 5 and 6. To this end and as one practical arrangement the upper openings 5, while generally round or circular in plan and a little larger than the path or orbit of the propeller blades, are extended out forwardly to the leading edge of the wing B and terminate there in straight frontal margins as designated at 5a. Upper covers 26 of rectangular shape are hinged at 27 to these frontal margins 5a and are arranged to swing over and close a frontal part of the openings 5 as shown in Figure 1, the said covers being of curved or arcuate cross section (Figure 3) conforming to the usual rounded nose portion of the wing B. The hinges 27 are of the spring type designed to normally swing the covers 26 forwardly and downwardly as shown in dotted lines in Figure 3 whereby the whole of the openings 5 is uncovered. A cable drum 28 is journaled in the fuselage A in suitable position convenient to the hand of the pilot and cables 29 and 30 are secured thereto from which they lead forwardly and outwardly around pulleys 31 to their outer ends where they are secured to horns 32 on the inner sides of the covers 26 adjacent the hinges 27. The pilot may by rotating the drum 28 to slack off the cables 29 and 30 release the covers 26 so that the spring hinges 27 swing the same outward as described and then may rotate the drum in opposite direction to wind up the cables and pull the covers closed as will be readily apparent.

In similar manner the outer part of the lower openings 6 is substantially round but are extended inwardly toward the fuselage A to provide straight inner margins 6a to which lower covers 33 are hinged at 34, these covers being the same shape as, and adapted when closed to fully cover the openings 6. Horns 35 are extended downward from the covers 33 adjacent the hinges 34 and links 36 are pivotally attached at 37 thereto from whence they extend freely and slidably inward through the side walls A' of the fuselage A and are pivoted at 38 to diametrically opposite points on one end of the cable drum 28. These connections 38 are so located that as the drum 28 is turned to unwind the cables 29 and 30 and open the top covers 26 a pull is exerted on the links 36 to pull the lower covers 33 open as shown in Figure 2, said covers then swinging down adjacent the sides of the fuselage A. As the drum 28 is rotated in opposite direction to close the upper covers 26 the links 36 are pushed outward also closing the lower covers 33. As an alternative arrangement the covers might be of flexible material and arranged on rollers to roll up when not in use or to be pulled out over the openings 5 and 6 when desired.

The helicopter propellers may be located in either the upper or lower wing of a biplane and in all cases are, of course, so arranged as to preserve both the lateral and fore and aft balance of the plane. In lieu of the auxiliary engine 15 suitable connections (not shown) may be provided to connect the helicopter propellers to the usual engine, either together with, or independent from the straight-away propellers.

While I have herein set forth a certain embodiment of my invention it is understood that I may vary from the same in minor details so as best to provide a practical device for the purposes in view, not departing from the spirit of the invention and within the scope of the appended claims.

I claim:

1. In an aeroplane including a fuselage and a wing having spaced upper and lower surfaces with vertically aligned openings therethrough, and including a helicopter propeller operatively mounted within the wing between the said openings thereof, the combination of upper and lower covers hinged to the margins of the wings and adapted to open and close outwardly over said openings, and means for simultaneously opening and closing the said covers.

2. In an aeroplane including a fuselage and a wing having spaced upper and lower surfaces with vertically aligned openings therethrough, and including a helicopter operatively mounted within the wing between the said openings thereof, the combination of a cover for the upper opening the same being hinged at the forward margin of the wing and being spring-set to normally open outwardly and forwardly, a cover for the lower opening the same being hinged laterally adjacent the fuselage and adapted to open outwardly and downwardly, a drum journaled within the fuselage, a cable secured at one end to the drum and at the other end to the upper cover the cable being trained around the drum and adapted upon its rotation in one direction to close the cover against the action of the spring thereof, and upon rotation in the opposite direction to permit the cover to open, and a rigid link connected freely and eccentrically at one end to the said drum and at the other end freely to the said lower cover, and adapted upon rotation of the drum to close or open the lower cover simultaneously with the closing or opening of the upper cover.

GEORGE ADAMS SHAMBERGER.